(12) United States Patent
Hyvonen et al.

(10) Patent No.: US 8,212,735 B2
(45) Date of Patent: Jul. 3, 2012

(54) NEAR FIELD COMMUNICATION

(75) Inventors: Lassi Hyvonen, Helsinki (FI);
Alexandre Pinto, Copenhagen (DK);
Jens Troelsen, Copenhagen (DK)

(73) Assignee: Nokia Corporation, Espoo (FI)

( * ) Notice: Subject to any disclaimer, the term of this patent is extended or adjusted under 35 U.S.C. 154(b) by 374 days.

(21) Appl. No.: 12/455,751

(22) Filed: Jun. 5, 2009

(65) Prior Publication Data
US 2010/0309088 A1   Dec. 9, 2010

(51) Int. Cl.
*H01Q 21/00* (2006.01)

(52) U.S. Cl. ......... 343/867; 343/702; 343/742; 343/744

(58) Field of Classification Search .............. 343/867, 343/853, 855, 751, 893, 725, 728, 702, 742, 343/744, 866
See application file for complete search history.

(56) References Cited

U.S. PATENT DOCUMENTS

| | | | | |
|---|---|---|---|---|
| 4,089,003 A | | 5/1978 | Conroy | 343/700 |
| 5,274,388 A | | 12/1993 | Ishizaki et al. | 343/725 |
| 6,054,966 A | | 4/2000 | Haapala | 343/895 |
| 6,121,931 A | | 9/2000 | Levi | 343/700 |
| 6,972,723 B2 | * | 12/2005 | Sun | 343/702 |
| 2005/0092836 A1 | | 5/2005 | Kudo | 235/436 |
| 2006/0092080 A1 | | 5/2006 | Lee | 343/700 |
| 2006/0233356 A1 | | 10/2006 | Lu et al. | 379/433.01 |
| 2007/0008139 A1 | | 1/2007 | Saarisalo et al. | 340/572.7 |
| 2007/0057852 A1 | | 3/2007 | Leizerovich et al. | 343/702 |
| 2007/0126638 A1 | * | 6/2007 | Channabasappa | 343/700 MS |
| 2007/0171071 A1 | * | 7/2007 | Chiu et al. | 340/572.7 |
| 2008/0055167 A1 | | 3/2008 | Leizerovich et al. | 343/702 |
| 2008/0081631 A1 | | 4/2008 | Rofougaran | 455/452.1 |
| 2008/0238799 A1 | | 10/2008 | Tsushima | 343/788 |
| 2008/0246667 A1 | | 10/2008 | Symons | 343/702 |
| 2009/0001930 A1 | | 1/2009 | Pohjonen | 320/108 |
| 2009/0033465 A1 | * | 2/2009 | Mickle et al. | 340/10.1 |

FOREIGN PATENT DOCUMENTS

| | | |
|---|---|---|
| CN | 101093913 | 12/2007 |
| EP | 0 347 180 A2 | 6/1989 |
| EP | 0 790 669 B1 | 5/2000 |
| EP | 1748515 A1 | 1/2007 |
| EP | 1976055 A1 | 10/2008 |
| JP | 57058402 A * | 4/1982 |
| JP | 2005316768 | 11/2005 |
| JP | 2006121339 | 5/2006 |
| JP | 2007143132 | 11/2008 |
| KR | 100769540 | 10/2007 |
| WO | WO-2006087662 A2 | 8/2006 |
| WO | WO-2008031629 A1 | 3/2008 |

* cited by examiner

*Primary Examiner* — Dieu H Duong
(74) *Attorney, Agent, or Firm* — Harrington & Smith (57) ABSTRACT

Apparatus including: an antenna configured for efficient far field communication at a first frequency; an inductive element including a plurality of series-connected coiled portions, including a first coiled portion and a second coiled portion, wherein the inductive element is configured to provide near field communication at a second frequency; and at least one reactive element parallel connected between the first coiled portion and the second coiled portion, wherein the at least one reactive element has a lower impedance at the first frequency than at the second frequency.

22 Claims, 5 Drawing Sheets

FIG. 9C

NEAR FIELD COMMUNICATION

FIELD OF THE INVENTION

Embodiments of the present invention relate to near field communication and, in particular, near field communication at a radio transmitter and/or receiver apparatus.

BACKGROUND TO THE INVENTION

A radio transmitter and/or receiver apparatus uses an antenna to transmit and/or receive propagating electromagnetic radio waves (far-field communication) at one or more frequencies.

If an inductive element is used in the same apparatus it may have an adverse effect on the operation of the antenna.

BRIEF DESCRIPTION OF VARIOUS EMBODIMENTS OF THE INVENTION

According to various, but not necessarily all, embodiments of the invention there is provided an apparatus comprising: an antenna configured for efficient far field communication at a first frequency; an inductive element comprising a plurality of series-connected coiled portions, including a first coiled portion and a second coiled portion, wherein the inductive element is configured to provide near field communication at a second frequency; and at least one reactive element parallel connected between the first coiled portion and the second coiled portion, wherein the at least one reactive element has a lower impedance at the first frequency than at the second frequency.

According to various, but not necessarily all, embodiments of the invention there is provided a method comprising: providing an inductive element comprising a plurality of series-connected coiled portions, including a first coiled portion and a second coiled portion; and providing at least one reactive element in parallel connection between the first coiled portion and the second coiled portion of the inductive element, to produce a modified inductive element configured to provide near field communication at a second frequency when used in an apparatus configured for efficient far field radio communication at a first frequency different to the second frequency.

According to various, but not necessarily all, embodiments of the invention there is provided an apparatus comprising: an inductive element comprising a plurality of series-connected coiled portions, including a first coiled portion and a second coiled portion; and at least one reactive element parallel connected between the first coiled portion and the second coiled portion.

As the inductive element with reactive elements does not adversely effect the operation of the antenna, the inductive element with reactive elements can be positioned close to the antenna. This saves space which is a premium in a hand-portable apparatus.

The ability to position the inductive element with reactive elements close to the antenna without adversely affecting the antenna performance allows the inductive element with reactive elements and the antenna to be co-located in a stacked arrangement. Any window in a metallic cover of the apparatus need only be small.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The Figures schematically illustrate an apparatus 10 comprising: an antenna 2 configured for efficient far field communication at a first frequency; an inductive element 20 comprising a plurality of series-connected coiled portions 22, including a first coiled portion and a second coiled portion, wherein the inductive element 20 is configured to provide near field communication at a second frequency; and at least one reactive element 30 connected electrically in parallel between the first coiled portion and the second coiled portion, wherein the at least one reactive element 30 has a lower impedance at the first frequency than at the second frequency.

The antenna 2 is configured for efficient far field communication at the first frequency. The antenna is configured to transmit and/or receive propagating electromagnetic radio waves at the first frequency.

The first frequency of the antenna 2 lies within an operational bandwidth of the antenna 2 created by a resonant mode having a resonant frequency. "Operational bandwidth" is a frequency range over which an antenna can efficiently operate. Efficient operation occurs, for example, when the antenna's insertion loss S11 is greater than an operational threshold such as 4 dB or 6 dB.

The antenna 2 may be configured to have an operational bandwidth/resonance in a region between 800 MHz and 2500 MHz, for example.

This range of frequencies includes the cellular radio frequencies, Bluetooth frequencies and the General Positing System (GPS) frequencies, and may contain other radio protocols not listed here.

For example the antenna 2 may have an operational bandwidth that covers all or some of the bands in a first range of lower cellular frequencies (824-960 MHz). This lower frequency range includes the European and US GSM bands [US-GSM 850 (824-894 MHz); EGSM 900 (880-960 MHz)], the European Wideband CDMA band [EU-WCDMA 900 (880-960 MHz)] and the US Wideband CDMA band (US-WCDMA 850).

For example the antenna 2 may have additionally or alternatively an operational bandwidth that covers all or some of the bands in a second range of higher cellular frequencies (1710-2180 MHz). This higher range includes the bands: PCN/DCS1800 (1710-1880 MHz); US-WCDMA1900 (1850-1990 MHz); WCDMA21000 (Tx: 1920-1980 MHz Rx: 2110-2180 MHz); PCS1900 (1850-1990 MHz); and the US Wideband CDMA band (US-WCDMA 1700)

A suitable antenna for operating in one or more of these cellular bands is a planar inverted F antenna (PIFA) or a switchable PIFA. Other antenna types, as known in the art, may also be used for the cellular frequency bands, for example, loop antennas, dipoles, monopoles, etc.

Alternatively, the antenna 2 may have an operational bandwidth that covers the GPS band (1570.42-1580.42 MHz).

Alternatively, the antenna 2 may have an operational bandwidth that covers the Bluetooth band (2400-2483.5 MHz).

Figure 1:
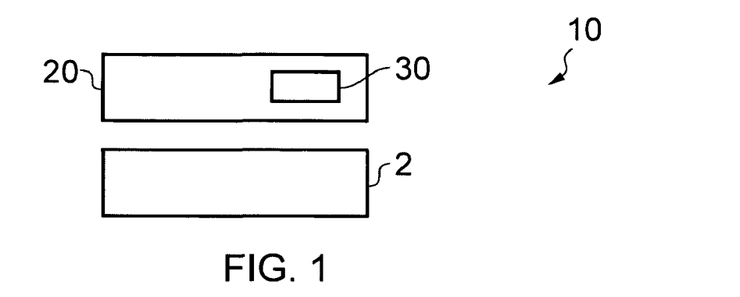
FIG. 1 schematically illustrates an apparatus comprising an antenna and an inductive element having at least one connected reactive element.
Figure 2A:
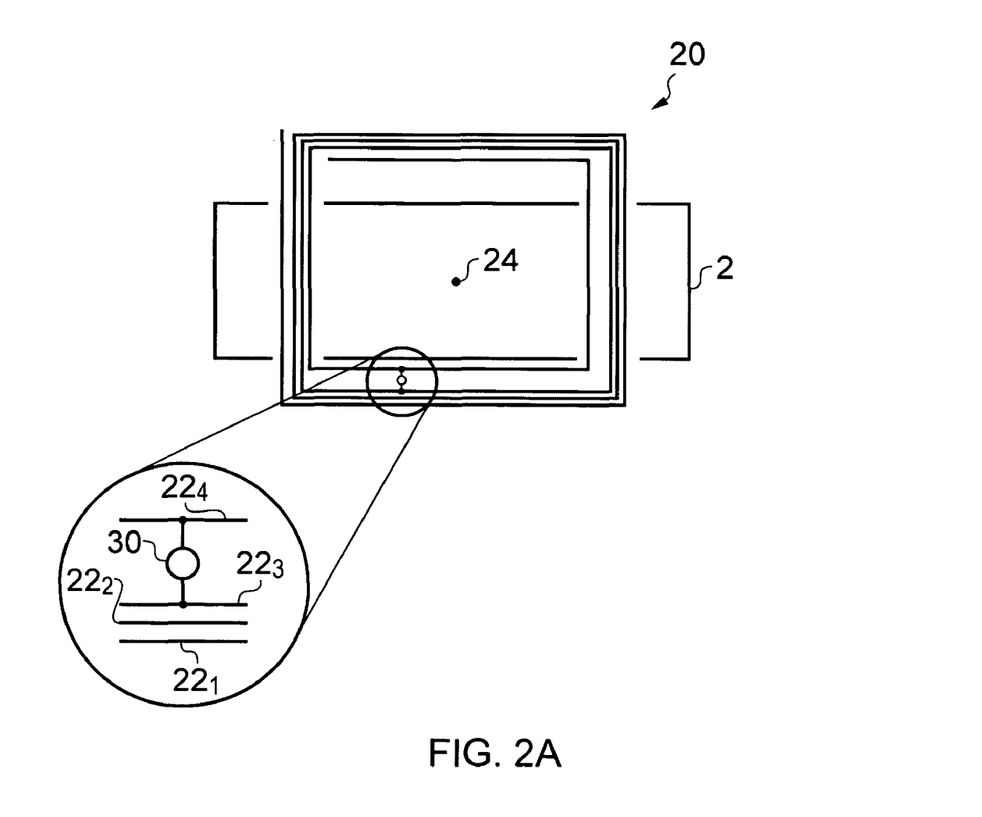
FIG. 2A illustrates, in plan view, one example of an inductive element that has a connected reactive element.
Figure 2B:
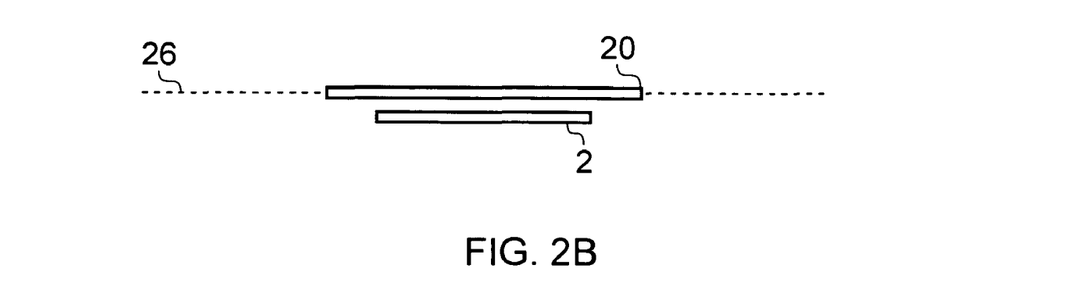
FIG. 2B illustrates, in side view, the inductive element from FIG. 2A.

An example of an inductive element 20 is illustrated in FIGS. 2A and 2B. FIG. 2A is a plan view, from above, of the inductive element 20 and FIG. 2B is a side view of the inductive element 20.

The inductive element 20 comprises a plurality of series-connected coiled portions $22_n$. In the illustrated example there are four coiled portions $22_1$, $22_2$, $22_3$, $22_4$. Each coiled portion is a galvanic conductor. As the coiled portions $22_n$ are series connected there is a single Ohmic path that runs through each of the coiled portions $22_n$ in turn.

The inductive element 20 is configured to provide near field communication at a second frequency. The second frequency may, for example, be 13.56 MHz +/−7 kHz (unlicensed) which is the frequency used for the Near Field Communications (NFC) Standard.

The inductive element 20 may be used for contactless power transfer that is transfer of power without galvanic/Ohmic connection. The operational distance of the inductive element 20 is short and may be dependent upon the length of the galvanic path provided by the coiled portions 22 and/or the area bound by the windings of the coil. For example its operational distance may be less than 10 cm or less than 4 cm.

In FIG. 2A or 2B, the coiled galvanic conductor of the inductive element 20 forms a series of concentric coils. In other implementations, the inductive element 20 can be formed by coils that can overlap in different layers. The shape of the coils may vary and in the illustrated example they are rectangular loops. The concentric nature of the coils creates a strongly directional magnetic field (H) when current flows along the Ohmic path of the galvanic conductor. There is constructive interference of the H field in the area inside the coils and destructive interference of the H field in the area outside the coils. This creates a strongly directional magnetic field H that is maximal inside the coils and extends into/out of the plane of the paper in FIG. 2A along a centre axis 24.

The inductive element 20 forms one half of an air core transformer, the other half being formed by the device with which it communicates.

The inductive element 20 illustrated in FIG. 2A or 2B may lie substantially within a single two dimensional plane 26. The galvanic conductor forming the inductive element 20 spirals (curls upon itself) about the centre axis 24. Each of the coiled portions 22 form spiraling loops that have a different separation from the centre axis.

In the illustrated example, the coiled portions 22 forming the spiraling loops are rectangular in shape. Each coiled portion comprises a first straight section connected through a right angled corner to a second straight section. The second straight section is connected through a right angled corner to a third straight section. The third straight section is connected through a right angled corner to a fourth straight section The fourth straight section is connected through a right angled corner to a first straight section of the next coiled portion 22 in the series.

Although this example relates to symmetrically aligned coils about a centre axis, there may be coils or loops which are not symmetrically aligned due to the overall shape being non-symmetrical. Although the inductive element 20 is illustrated in FIG. 2A or 2B in a two dimensional plane, the inductive element 20 may also be shaped in three dimensions to fit into a complex three dimensional body or chassis of a typical modern day portable electronic device, for example. In this example, the profile as illustrated in FIG. 2B may be substantially curved, or have any alternative shape, dependent on the shape of the body of the portable electronic device. Although in the example of FIG. 2A, the coiled portions 22 are rectangular in shape, other shapes may also be deployed, so that the coiled portions 22 fit around other components or modules within a typical portable electronic device As illustrated in FIG. 2A, at least one reactive element 30 is parallel connected between two different coiled portions 22.

In FIG. 2A, the reactive element 30 is connected between two coiled portions that are directly serially connected.

Figure 3:
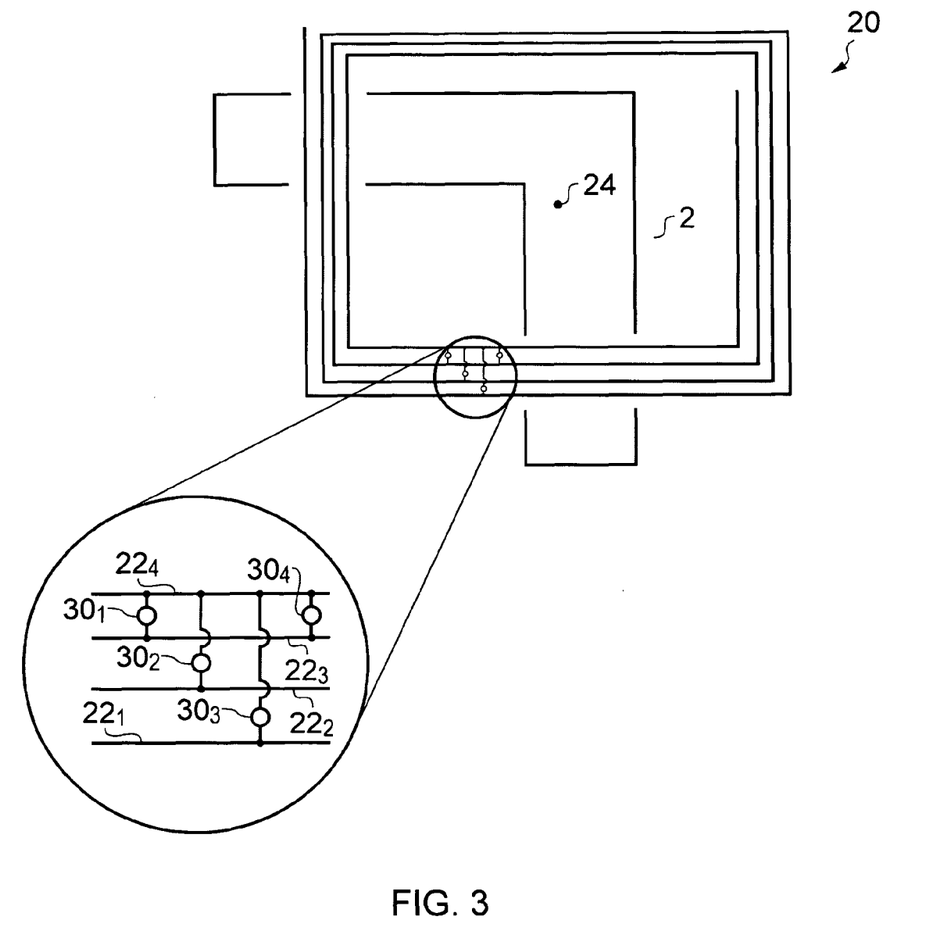
FIG. 3 illustrates, in plan view, an example of an inductive element that has a plurality of connected reactive elements.

In FIG. 3, the reactive element $30_1$ is connected between two coiled portions that are directly serially connected and the reactive element $30_4$ is connected between two coiled portions that are directly serially connected. The reactive element $30_2$ is connected between two coiled portions that are not directly serially connected. The reactive element $30_2$ is connected between the coiled portion $22_2$ and the coiled portion $22_4$. The coiled portion $22_2$ connects via the coiled portion $22_3$ with the coiled portion $22_4$. That is the Ohmic path runs from the coiled portion $22_2$ via the coiled portion $22_3$ to the coiled portion $22_4$. The reactive element $30_3$ is connected between two coiled portions that are not directly serially connected. The reactive element $30_3$ is connected between the coiled portion $22_1$ and the coiled portion $22_4$. The coiled portion $22_1$ connects via the series combination of the coiled portion $22_2$ and the coiled portion $22_3$ with the coiled portion $22_4$. That is the Ohmic path runs from the coiled portion $22_1$ via the coiled portion $22_2$ then via the coiled portion $22_3$ to the coiled portion $22_4$.

A reactive element 30 is a frequency dependent impedance having a lower impedance at the first frequency than at the second frequency. The impedance at the second frequency may be hundreds of times greater than the impedance at the first frequency. The impedance at the second frequency may have a value of several hundred Ohms or more. The impedance at the first frequency may have a value of several Ohms or less. The first frequency (e.g. 800 and 2500 MHz.) is higher than the second frequency (e.g. 13.56 MHz).

A reactive element 30 may for example be a high or band pass filter that has a high impedance (e.g. greater than 100 Ohms) at the second frequency but a low impedance (e.g. less than 10 Ohms) at the first frequency.

The arrangement comprising the inductive element 20 and the one or more reactive elements has a first current path at the first frequency and a second current path at the second frequency. The first current path is shorter than the second current path and therefore has a different resonant mode. The series connected coil portions are effectively also parallel connected at higher frequencies (the first frequency) but are not effectively parallel connected at lower frequencies (the second frequency).

A reactive element 30 may, for example, be a capacitor. A suitable capacitor may, for example, have a capacitance between approximately 20 and 100 pF, it may, for example, have a value of 33 pF.

The one or more reactive elements 30 modify the resonant characteristics of the inductive element 30 at the first frequency to reduce coupling between the antenna and the inductive element at operational frequencies of the antenna 2.

Although a certain arrangement of reactive elements 30 are illustrated in FIG. 3, it should be appreciated that reactive elements 30 may be positioned in many different ways between coiled portions 22 and all over the inductive element 20.

Figure 4A:
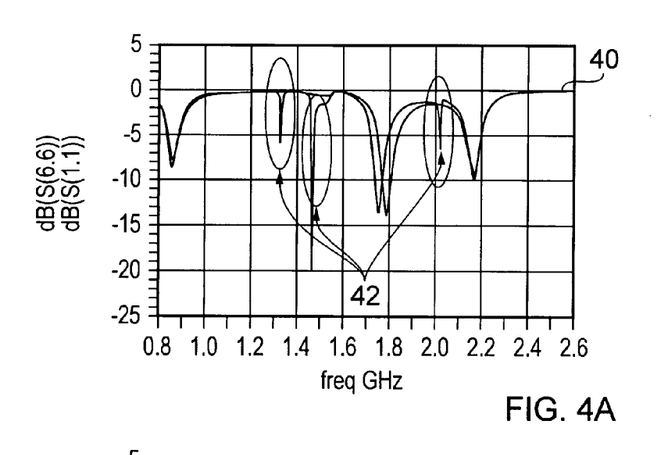
FIGS. 4A and 4B schematically illustrates the effect of an inductive element without connected reactive element(s) in a return loss S11 plot and a Smith Chart.
Figure 4B:
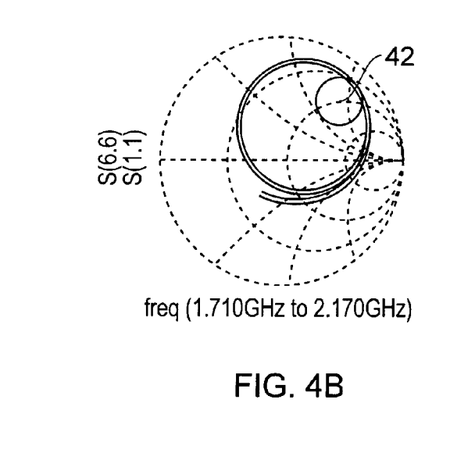

FIGS. 4A and 4B illustrate the performance of the antenna 2 when the inductive element 20 is present without reactive elements 30 being attached. FIG. 4A is a plot of the return loss S11 and FIG. 4B is a Smith Chart. Resonant modes within the inductive element 30 at the first frequency couple with the antenna 2 and create additional resonances 42 which compromise the performance of the antenna 2.

Figure 5A:
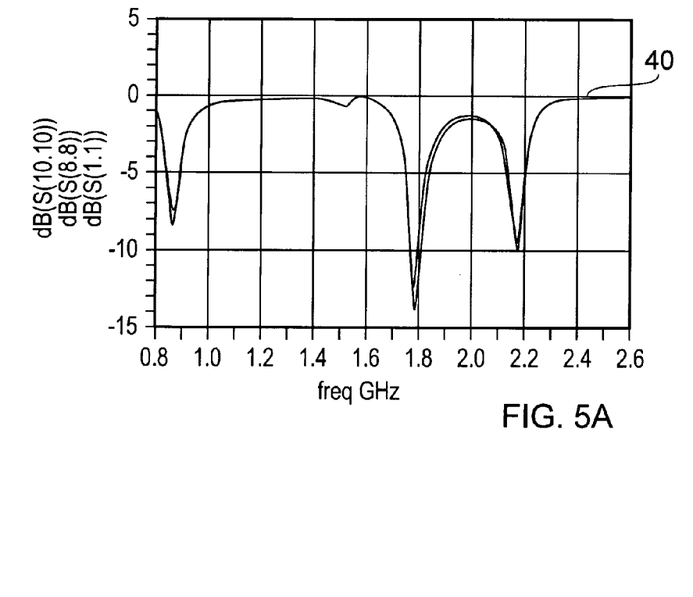
FIGS. 5A and 5B schematically illustrates the effect of an inductive element with connected reactive element(s) in a return loss S11 plot and a Smith Chart.
Figure 5B:
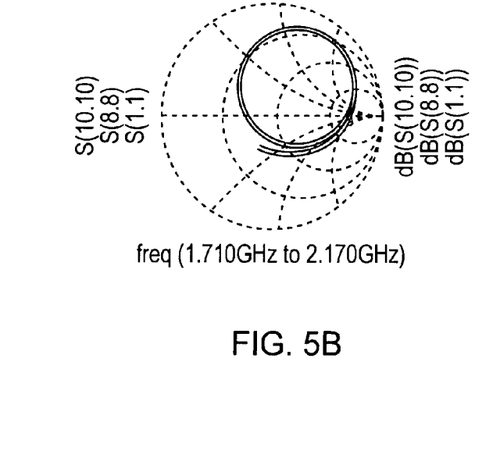

FIGS. 5A and 5B illustrate the performance of the antenna 2 when the inductive element 20 and reactive elements 30 are attached. FIG. 5A is a plot of the return loss S11 and FIG. 5B is a Smith Chart. The reactive elements 30 shift the resonant modes within the inductive element 30 away from the first frequency. This modification of the resonant characteristics of the inductive element 30 at the first frequency reduces coupling between the antenna 2 and the inductive element 20 at operational frequencies of the antenna 2.

Figure 6:
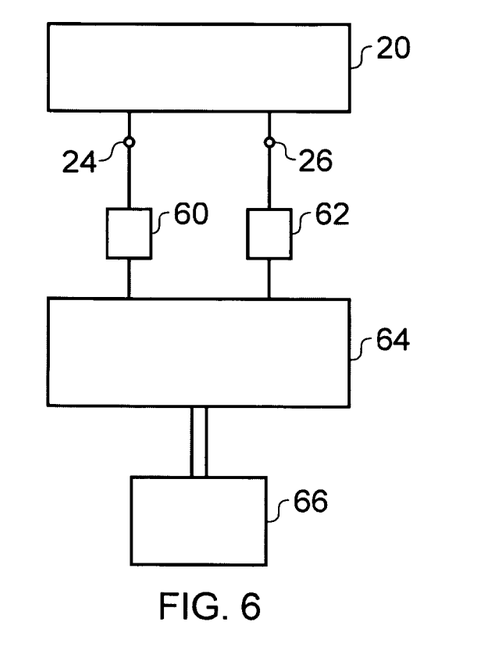
FIG. 6 schematically illustrates a matched connection of an inductive element (with reactive elements) to communication circuitry.

FIG. 6 schematically illustrates how the inductive element 20 (with reactive elements 30 attached) may be connected to communication circuitry 66 that provides a modulated electric current to the inductive element 20 for near field communication. The circuitry 66 and the inductive element 20 are interconnected via matching circuitry 64 which matches the impedance of the inductive element 20 to that of the circuitry 66.

The inductive element 20 has a first port 24 connected at one end of the Ohmic path provided by the inductive element 20 and a second port 26 connected at the other end of the Ohmic path provided by the inductive element 20.

A first additional reactive element 60 is series connected to the first port 24. The first additional reactive element 60 has a higher electrical impedance at the first frequency than at the second frequency. The first additional reactive element 60 may have an impedance at the first frequency that is hundreds of times greater than the impedance at the second frequency. The impedance at the first frequency may, for example, be hundreds or thousands of Ohms.

The first additional reactive element 60 may, for example, be a band pass or low pass filter that has a low impedance at the second frequency but a high impedance at the first frequency. The first additional reactive element 60 decouples the inductive element 20 from the circuitry 66 at the first frequency. The first additional reactive element 60 may, for example, be an inductor. It may, for example, have an inductance of between 60 nH and 600 nH.

A second additional reactive element 62 is series connected to the second port 26. The second additional reactive element 62 has a higher electrical impedance at the first frequency than at the second frequency. The second additional reactive element 62 may have an impedance at the first frequency that is hundreds of times greater than the impedance at the second frequency. The impedance at the first frequency may, for example, be hundreds or thousands of Ohms.

The second additional reactive element 62 may, for example, be a band pass or low pass filter that has a low impedance at the first frequency but a high impedance at the second frequency. The second additional reactive element 62 decouples the inductive element 20 from the circuitry 66 at the first frequency. The second additional reactive element 62 may, for example, be an inductor. It may, for example, have an inductance of between 60 nH and 200 nH.

Although in FIG. 6 the additional reactive elements 60, 62 are illustrated as separate components to the matching circuitry 64, in other implementations the additional reactive elements 60, 62 may be incorporated within the matching circuitry 64.

Figure 7:
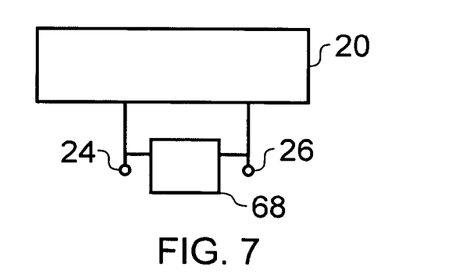
FIG. 7 schematically illustrates the use of a filter in combination with the inductive element (with reactive elements)

As illustrated in FIG. 7, a filter 68 may, in some embodiments, be positioned between the first port 24 and the second port 26 to enable simultaneous operation of the inductive element 20 for near field communications and the antenna 2 for radio communications.

Figure 8:
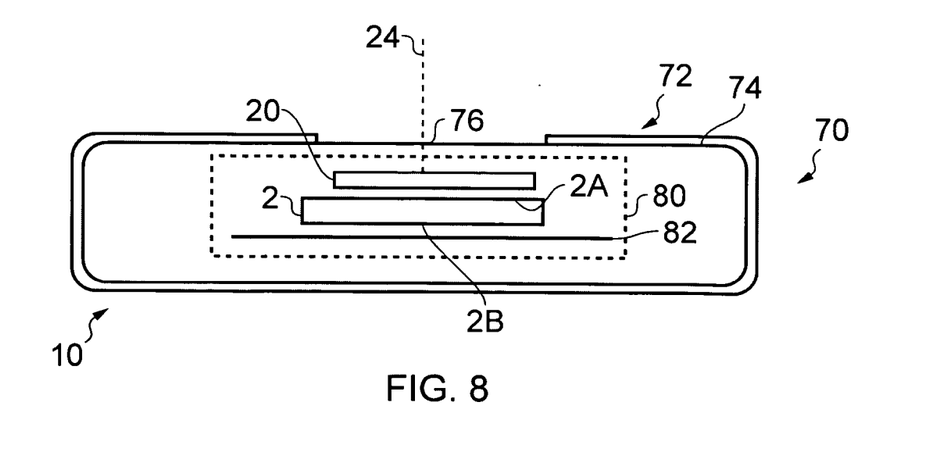
FIG. 8 schematically illustrates an example of how the inductive element (with reactive elements) and the antenna are positioned within a housing of a radio apparatus.

FIG. 8 schematically illustrates a radio apparatus 10 which is configured to transmit and/or receive propagating electromagnetic radio waves at the operational frequencies of the antenna 2. The radio apparatus 10 may, for example, be a hand portable radio apparatus that is sized for carrying within the palm of the hand or a jacket pocket. The radio apparatus 10 may, for example, operate as a mobile cellular telephone, a satellite positioning system, a short range communication device, etc.

FIG. 8 illustrates how the antenna 2 and inductive element 20 with its attached reactive elements 30 may be positioned. The inductive element 20 and the antenna 2 may be placed in very close proximity with a separation of less than 3 mm or 1 mm. The reactive elements 30 decouple the inductive element 20 from the antenna 2 at the operational frequencies of the antenna 2 which enables the inductive element 20 and the antenna 2 to be in close proximity without adversely affecting the performance of the antenna 2.

In use, the inductive element 20 generates a maximum magnetic field substantially aligned along the centre axis 24. The inductive element 20 and the antenna 2 are co-located at different positions along the axis in a stacked arrangement.

In the illustrated example, the antenna 2 is substantially planar having an upper side 2A and an opposing lower side 2B. The inductive element 30 is positioned on the axis displaced above the first upper side 2A of the antenna 2 and a ground plane 82 is positioned on the axis displaced below the second lower side 2B of the antenna 2.

The inductive element 20 does not comprise a ferrite core and the inductive element 20 operates, in use, as an air core transformer.

The inductive element 20 including its attached reactive elements 30 and the antenna (with or without the ground plane 82) may be incorporated within a module 80. As used here 'module' refers to a unit or apparatus that excludes certain parts/components that would be added by an end manufacturer or a user.

In FIG. 8, the inductive element 20 including its attached reactive elements 30 and the antenna with ground plane 82 are housed within a radio apparatus 10 comprising a housing 70. The housing may, for example, be plastic or metallic, or a combination of both. The housing 70 comprises a face 72 presenting a metallic exterior 74 and a non-metallic portion 76 where metal is absent. In the illustrated example, the inductive element 20 overlies the antenna 2 and is positioned between the face 72 and the antenna 2. In other embodiments, the antenna 2 may overlie the inductive element 20 and is positioned between the face 72 and the inductive element 20. In further embodiments the antenna 2 may overlie the inductive element 20 partially so that there are some overlapped and some non-overlapped regions, this may be for the antenna 2 being positioned between the face 72 and the inductive element 20 or the inductive element 20 being positioned between the face 72 and the antenna 2. The non-metallic portion 76 is substantially aligned with both the antenna 2 and the inductive element 20 The housing 70 may have a substantially metal exterior except in the location of the non-metallic portion 76 and because the antenna 2 and inductive element 20 are in stacked alignment and in close proximity the size of the non-metallic portion 76 is small.

Figure 9A:
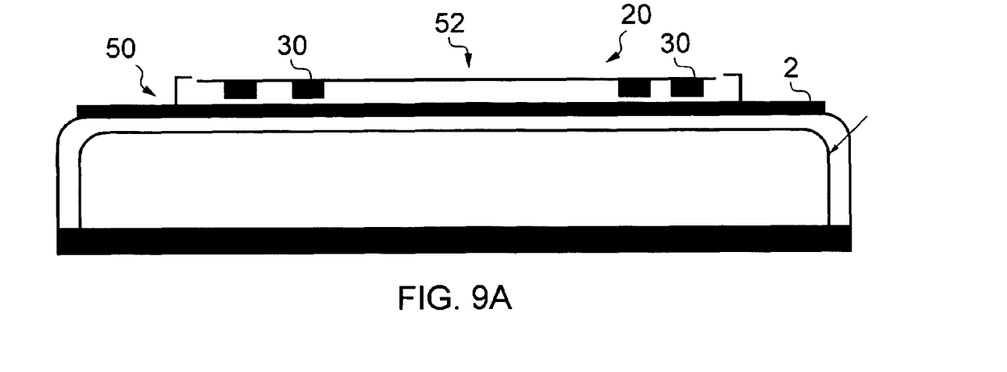
FIGS. 9A, 9B and 9C schematically illustrate different arrangements of the inductive element (with reactive elements) and the antenna.

FIG. 9A schematically illustrates an inductive element 20 with its attached reactive elements 30 glued to a support 52. A plastic support 50 separates the inductive element 20 from the antenna 2 by about 0.8 mm. The supports have a permittivity and loss tangent that does not increase radio frequency losses at the operational frequency bands of antenna 2.

Figure 9B:
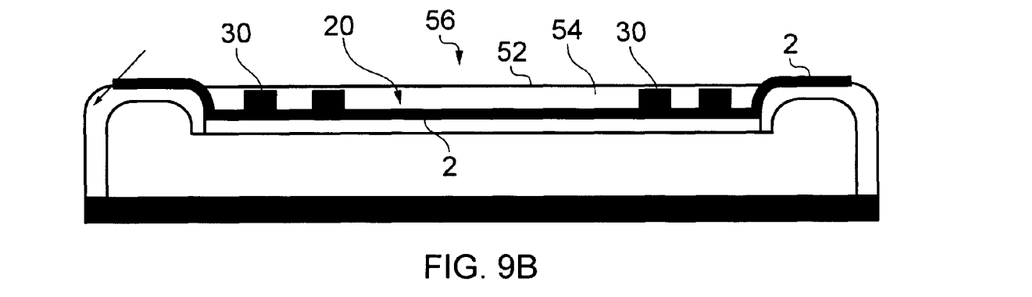

FIG. 9B schematically illustrates an inductive element 20 with its attached reactive elements 30 glued to a support 52. The antenna 2 lies within a well 54 bridged by the support 52. The sidewall portions of the well 54 and the support 52 form a substantially planar upper surface 56.

Figure 9C:
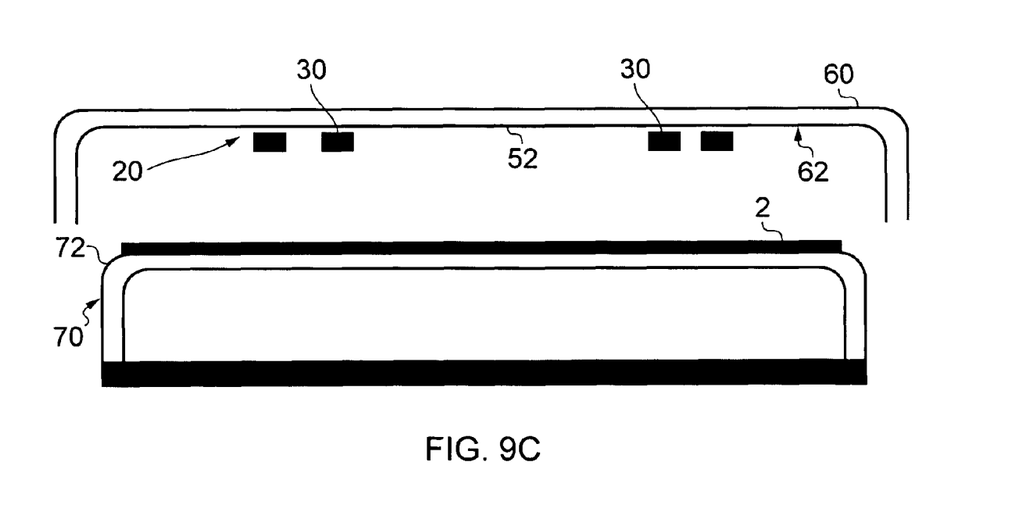

FIG. 9C schematically illustrates an inductive element 20 with its attached reactive elements 30 glued to a support 52. The support 52 is attached to an inside surface 62 of a cover portion 60 of the housing. The antenna 2 is attached to a surface 72 of a portion 70 of the housing that is covered by the cover portion 60. When the cover portion 60 is attached to the portion 70, the inductive element 20 with its attached reactive elements is suspended from the inside surface 62 of the cover portion in close proximity to the antenna 2.

The inductive element 20 with its attached reactive elements 30 may be formed by:
a) providing an inductive element comprising a plurality of series-connected coiled portions, including a first coiled portion and a second coiled portion; and
b) providing at least one reactive element in parallel connection between the first coiled portion and the second coiled portion of the inductive element.

The one or more reactive elements produce a modified inductive element 20 configured to provide near field communication at a second frequency when used in an apparatus configured for efficient far field radio communication using an antenna at a first frequency different to the second frequency.

The design of the inductive element is such that the coupling between the PIFA and the inductive element is minimized by design even before the addition of the reactive elements.

Slots or slits may be placed in the antenna adjacent the inductive element to reduce lossy eddy currents. This improves the magnetic field strength H of the inductive element.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
an antenna configured for efficient far field communication at a first frequency;
an inductive element comprising a plurality of series-connected coiled portions, including a first coiled portion and a second coiled portion, wherein the inductive element is configured to provide near field communication at a second frequency; and at least one reactive element parallel connected between the first coiled portion and the second coiled portion, wherein the at least one reactive element has a lower impedance at the first frequency than at the second frequency,
wherein the inductive element and the at least one reactive element are configured to be co-located with the antenna without affecting performance of the antenna.

2. The apparatus as claimed in claim 1, wherein the inductive element spirals about a centre axis and wherein each of the coiled portions form spiraling loops having different separations from the centre axis.

3. The apparatus as claimed in claim 1, wherein the inductive element lies substantially within a two dimensional plane.

4. The apparatus as claimed in claim 1 wherein the first frequency is greater than the second frequency.

5. The apparatus as claimed in claim 1 wherein the at least one reactive element is predominantly capacitive.

6. The apparatus as claimed in claim 1 comprising a plurality of reactive elements connected in parallel between respective coiled portions of the inductive element and each having a lower impedance at the first frequency than at the second frequency.

7. The apparatus as claimed in claim 6 wherein the one or more reactive elements connected in parallel between respective coiled portions of the inductive element modify the resonant characteristics of the inductive element to reduce coupling between the antenna and the inductive element at operational frequencies of the antenna.

8. The apparatus as claimed in claim 1, wherein the inductive element has a first port and a second port and a first additional reactive element is series connected to the first port, wherein the first additional reactive element has a higher electrical impedance at the first frequency than at the second frequency.

9. The apparatus as claimed in claim 8, wherein a second additional reactive element is series connected to the output port, wherein the second additional reactive element has a higher electrical impedance at the first frequency than at the second frequency.

10. The apparatus as claimed in claim 8, wherein at least the first additional reactive element is comprised within a matching network for the inductive element configured to enable the inductive element to provide more efficient near field communications at 13.56 MHz.

11. The apparatus as claimed in claim 1, wherein the inductive element has a first port and a second port and a filter positioned between the first port and the second port that enables simultaneous operation of the inductive element for near field communications and the antenna for radio communications.

12. The apparatus as claimed in claim 1, further comprising a ground plane for the antenna wherein the inductive element is positioned on an axis displaced from a first side of the antenna and the ground plane is positioned on an axis displaced from a second side of the antenna wherein the second side opposes the first side.

13. The apparatus as claimed in claim 1, configured as a module.

14. The apparatus as claimed in claim 1 configured as a communication device comprising a metallic housing, wherein the housing comprises a face presenting a metallic exterior and a non-metallic portion where metal is absent, and wherein the non-metallic portion is substantially aligned with both the antenna and the inductive element.

15. The apparatus as claimed in claim 14, wherein the housing has a substantially metal exterior except in the location of the non-metallic portion.

16. A portable electronic device comprising the apparatus of claim 1.

17. The apparatus as claimed in claim 1 configured as a portable electronic device comprising a plastic or nonmetallic housing.

18. A method comprising:
provoking an inductive element comprising a plurality of series-connected coiled portions, including a first coiled portion and a second coiled portion; and
providing at least one reactive element in parallel connection between the first coiled portion and the second coiled portion of the inductive element, to produce a modified inductive element configured to provide near field communication at a second frequency when used in an apparatus configured for efficient far field radio communication at a first frequency different to the second frequency,
wherein the inductive element and the at least one reactive element are configured to be co-located with an antenna without affecting performance of the antenna.

19. An apparatus comprising:
an inductive element comprising a plurality of series-connected coiled portions, including a first coiled portion and a second coiled portion; and
at least one reactive element parallel connected between the first coiled portion and the second coiled portion,
wherein the inductive element and the at least one reactive element are configured to be co-located with an antenna without affecting performance of the antenna.

20. The apparatus as claimed in claim 19, wherein the inductive element is configured to provide near field communication at a first frequency of 13.56 MHz ±7 kHz.

21. The apparatus as claimed in claim 19, wherein the at least one reactive element is configured to have a first impedance at a first frequency and a second impedance at a second frequency, wherein the second frequency is at least 100 times greater than the first frequency.

22. The apparatus as claimed in claim 19, wherein the inductive element is a coiled galvanic conductor.

* * * * *